No. 12,646. REISSUED MAY 7, 1907.

C. H. COCHRAN.

PRESSED STEEL JOURNAL BOX FOR RAILWAY CARS.

APPLICATION FILED APR. 6, 1907.

3 SHEETS—SHEET 1.

WITNESSES.

M. A. Keller

M. A. Bent

INVENTOR.

Charles H. Cochran by James K. Bakewell his attorney

No. 12,646.

REISSUED MAY 7, 1907.

C. H. COCHRAN.

PRESSED STEEL JOURNAL BOX FOR RAILWAY CARS.

APPLICATION FILED APR. 6, 1907.

3 SHEETS—SHEET 2.

WITNESSES.

W. G. Keller

MaBeith

INVENTOR.

Charles H. Cochran by James K. Blackwell his attorney

No. 12,646. REISSUED MAY 7, 1907.

C. H. COCHRAN.

PRESSED STEEL JOURNAL BOX FOR RAILWAY CARS.

APPLICATION FILED APR. 6, 1907.

3 SHEETS—SHEET 3.

WITNESSES.

W. C. Keller.

M. A. Grant

INVENTOR.

Charles H. Cochran by James R. Bakewell his attorney

UNITED STATES PATENT OFFICE.

CHARLES H. COCHRAN, OF AVALON, PENNSYLVANIA, ASSIGNOR OF TWENTY-FOUR AND ONE-HALF ONE-HUNDREDTHS TO CHARLES L. OWEN, OF AVALON, PENNSYLVANIA, AND FIFTY-ONE ONE-HUNDREDTHS TO W. H. SHINN, OF CARNEGIE, PENNSYLVANIA.

PRESSED-STEEL JOURNAL-BOX FOR RAILWAY-CARS.

No. 12,646. Specification of Reissued Letters Patent. Reissued May 7, 1907.

Original No. 845,726, dated February 26, 1907. Application for reissue filed April 6, 1907. Serial No. 366,367.

*To all whom it may concern:*

Be it known that I, CHARLES H. COCHRAN, of Avalon, in the county of Allegheny and State of Pennsylvania, have invented a new and useful Pressed-Steel Journal-Box for Railway-Cars, of which the following is a full, clear, and exact description, reference being had to the accompanying drawings, in which—

Figure 1:
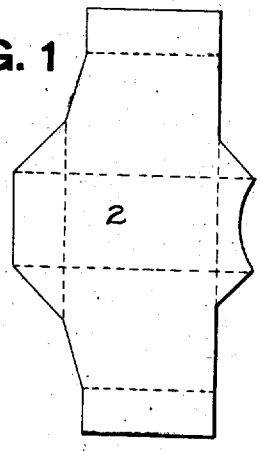
Figure 2:
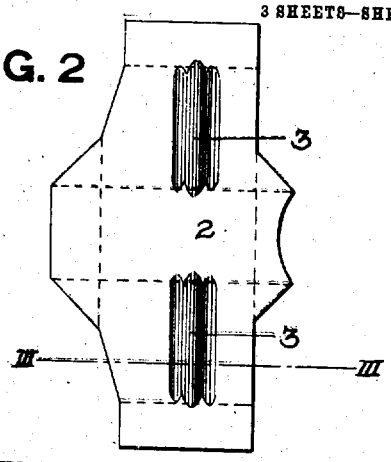
Figure 3:
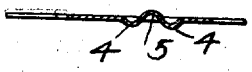
Figure 4:
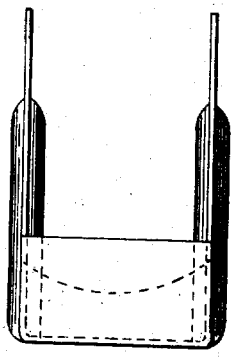
Figure 5:
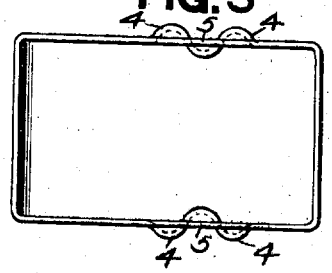
Figure 6:
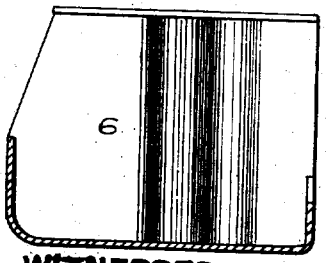
Figure 7:
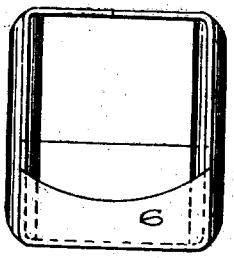
Figure 8:
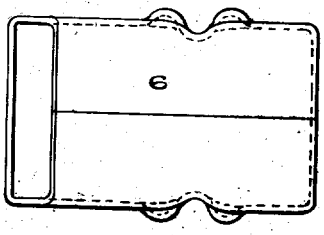
Figure 9:
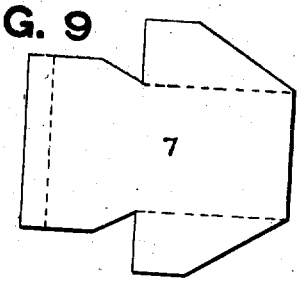
Figure 10:
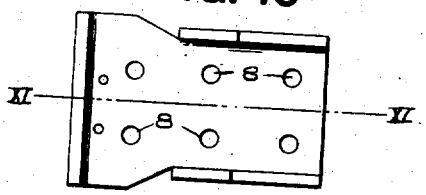
Figure 11:
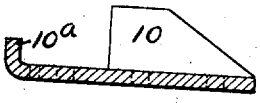
Figure 12:
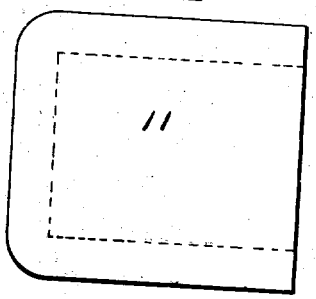
Figure 13:
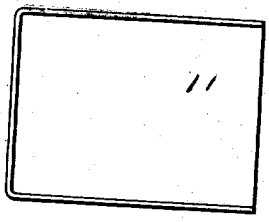
Figure 14:
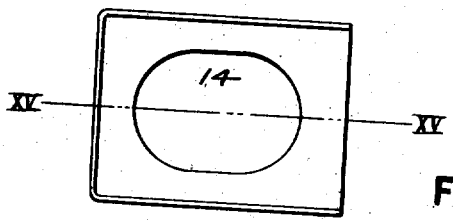
Figure 15:
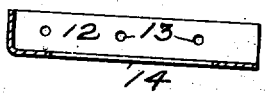
Figure 16:
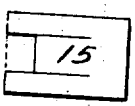
Figure 17:
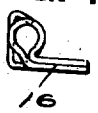
Figure 18:
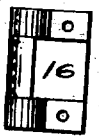
Figure 19:
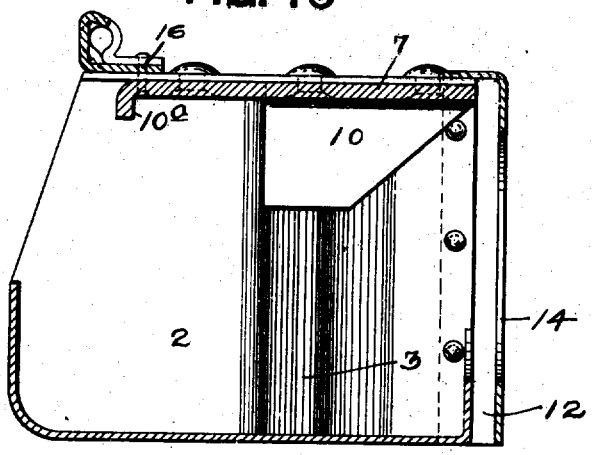
Figure 20:
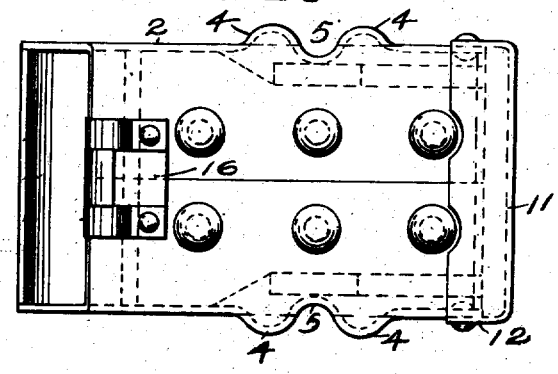
Figure 21:
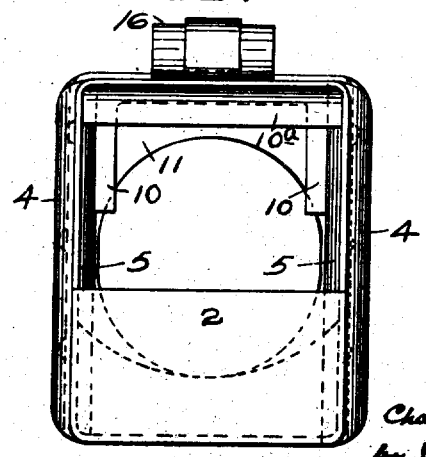

Figure 1 is a plan view of the blank, the lines on which the blank is to be bent being indicated by dotted lines. Fig. 2 is a plan view of the same after the blank has been corrugated. Fig. 3 is a cross-sectional view on the line III—III of Fig. 2. Fig. 4 is a front end view of the blank, the sides and end portions having been pressed into shape. Fig. 5 is a plan view of the same. Fig. 6 is a longitudinal vertical sectional view of the finished blank. Fig. 7 is a rear end view of the same. Fig. 8 is a plan view of the same. Fig. 9 is a plan view of the blank of the lug-plate, the lines on which it is to be bent being indicated by the dotted lines. Fig. 10 is a plan view of the same after it has been bent and after the rivet holes have been punched. Fig. 11 is a longitudinal sectional view of the same. Fig. 12 is a plan view of the guide-plate blank, the lines on which it is to be bent being indicated by dotted lines. Fig. 13 is a plan view of the same after it has been pressed. Fig. 14 is a plan view of the guide-plate, showing the aperture for the passage of the axle. Fig. 15 is a longitudinal sectional view of the same, showing the rivet holes in the side flange. Fig. 16 is a plan view of the hinge-clip blank. Fig. 17 is a side view of the clip after it has been formed. Fig. 18 is a plan view of the same. Fig. 19 is an enlarged longitudinal vertical sectional view of the finished box. Fig. 20 is a plan view of the same, and Fig. 21 is a front view of the same.

Like symbols of reference indicate like parts wherever they occur.

My invention relates to an improvement in journal boxes for railway-cars; and it consists in forming a journal-box of pressed-steel from two or more blanks, the main body of the box being made of a single piece cut to the proper shape and pressed to the desired form.

I will now describe my invention so that others skilled in the art may manufacture and use the same.

In the drawing, 2 represents the blank from which the main portion of the box is made, the blank being cut from sheet-steel to the form shown in Fig. 1. This blank 2 is then placed in a suitable stamp or press, and the corrugations 3 are pressed to a suitable depth. The purpose of these corrugations is to form ribs 4 on the outer face of the finished box, between which are the cavities 5 for the passage of the bolts. After the blank 2 has been thus formed it is placed in a suitable press, where by means of suitable dies it is pressed first to the form shown in Figs. 4 and 5 and then to the form of the box 6 shown in Figs. 6, 7, and 8. The bent and pressed body 6 is open at the front and rear. To close the top of the box and to strengthen the body of the box, I form what I call the "lug-plate" by cutting a blank 7, (shown in Fig. 9,) pressing the plate to the finished form shown in Figs. 10 and 11, and then punching rivet holes 8 therein. This plate is provided with depending flanges 10, which when the plate is secured to the top of the body 6 form rests or stops for the brass or bearing of the journal-box, the flange $10^a$ also forming a rest for the stop-wedge. The plate also serves as a reinforcement to the top of the box. At the rear of the journal-box is a guide-plate, which serves as a guide to the dust-guard. This guide-plate is formed from the blank 11, cut to the form shown in Fig. 12, and pressed to the form shown in Fig. 13, the flanges 12, which are formed by the pressing, being provided with rivet-holes 13, by means of which the plate is secured to the rear of the box. Before being so secured, however, the elliptical aperture 14 is cut in the plate for the passage of the axle.

The hinge-clip 16, by means of which the door is hinged to the box, is formed from a suitable sheet-metal blank 15, cut to the shape shown in Fig. 16, which is then pressed and bent to the form 16 shown in Figs. 17 and 18. This hinge-clip is provided with rivet holes, by means of which the clip is secured to the front edge of the box, as is shown in Figs. 19, 20, and 21.

The journal-box thus formed of pressed-steel is light, strong, and durable, and it is capable of being formed with the minimum expenditure of time and labor.

Having thus described my invention, what I claim, and desire to secure by Letters Patent is—

1. A pressed-steel journal-box having a body portion formed of a single piece of pressed-steel, the edges of which meet at the top, and a lug-plate overlapping the seam in the body portion and secured thereto, said lug-plate being provided with depending front and side flanges; substantially as described.

2. A pressed-steel journal-box comprising a body portion formed of a single piece of pressed steel, the edges of which meet at the top, a lug-plate overlapping the seam in the body portion and provided with front and side flanges to form rests for the stop-wedge and journal-brass, respectively, and a guide-plate, said parts being secured together; substantially as described.

In testimony whereof, I have hereunto set my hand.

CHARLES H. COCHRAN.

Witnesses:
JAMES K. BAKEWELL,
C. E. EGGERS.